Oct. 23, 1945. S. K. ANDERSEN ET AL 2,387,426
OIL COOLER PROTECTIVE DEVICE
Filed Oct. 9, 1941 2 Sheets-Sheet 1
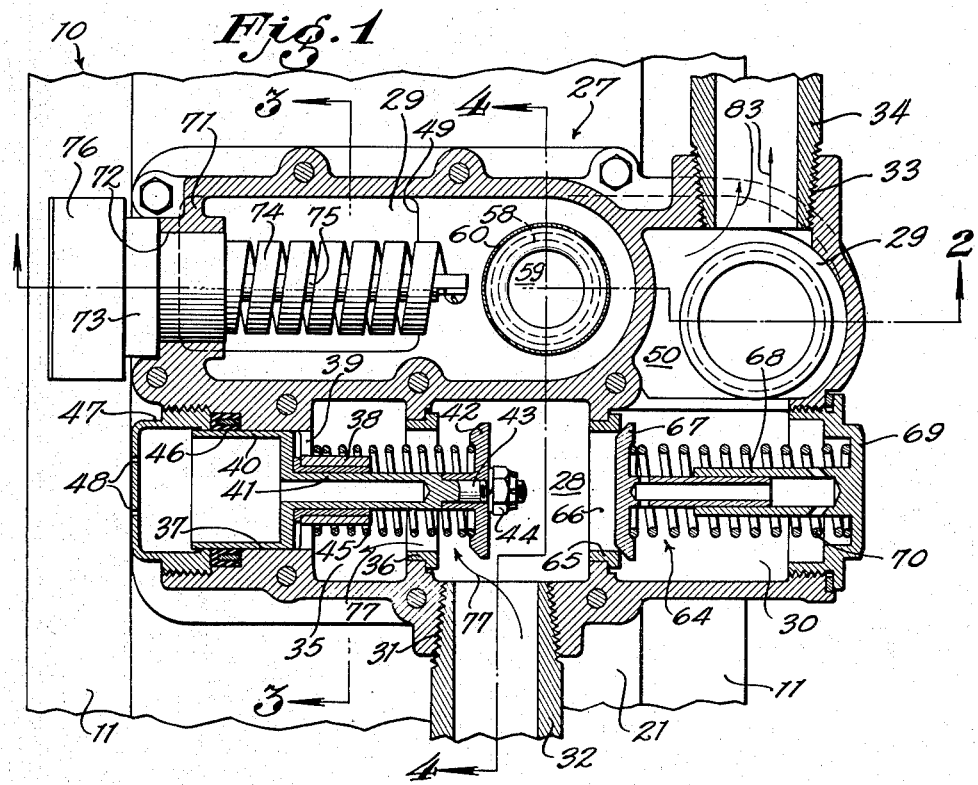
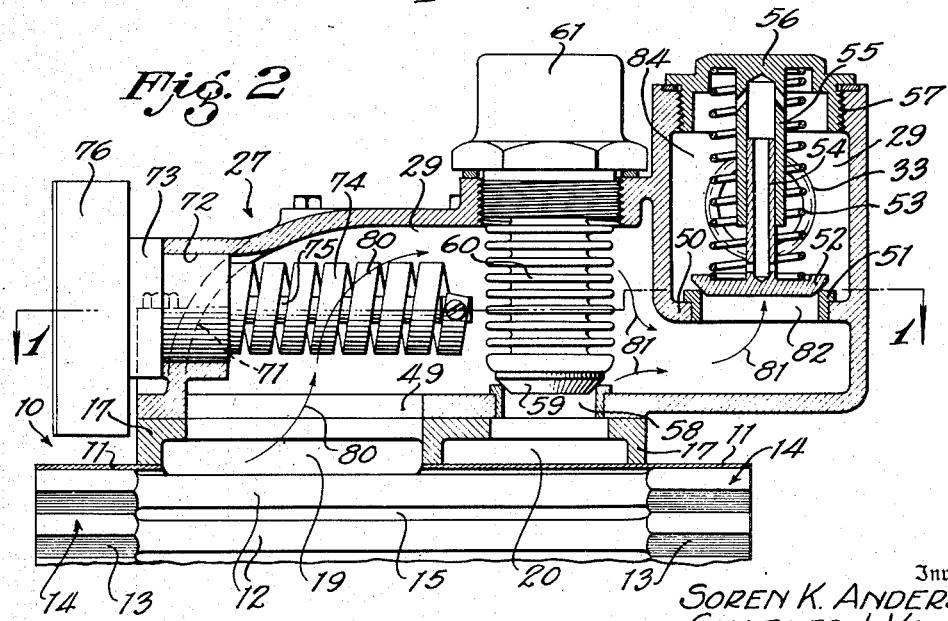
Inventors,
SOREN K. ANDERSEN
CHARLES J. VANOUS
By
Attorney Oct. 23, 1945.   S. K. ANDERSEN ET AL   2,387,426
OIL COOLER PROTECTIVE DEVICE
Filed Oct. 9, 1941   2 Sheets-Sheet 2
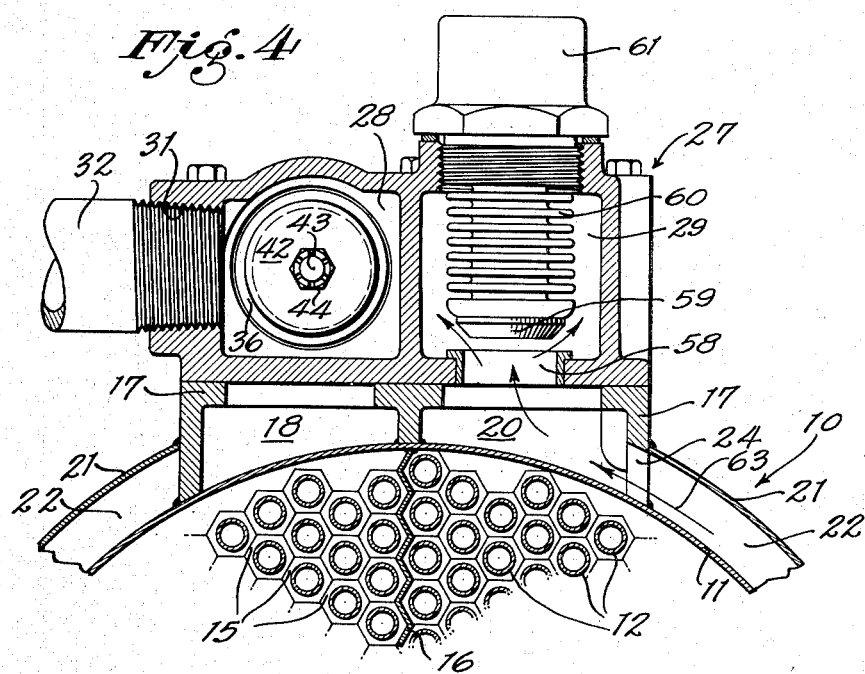
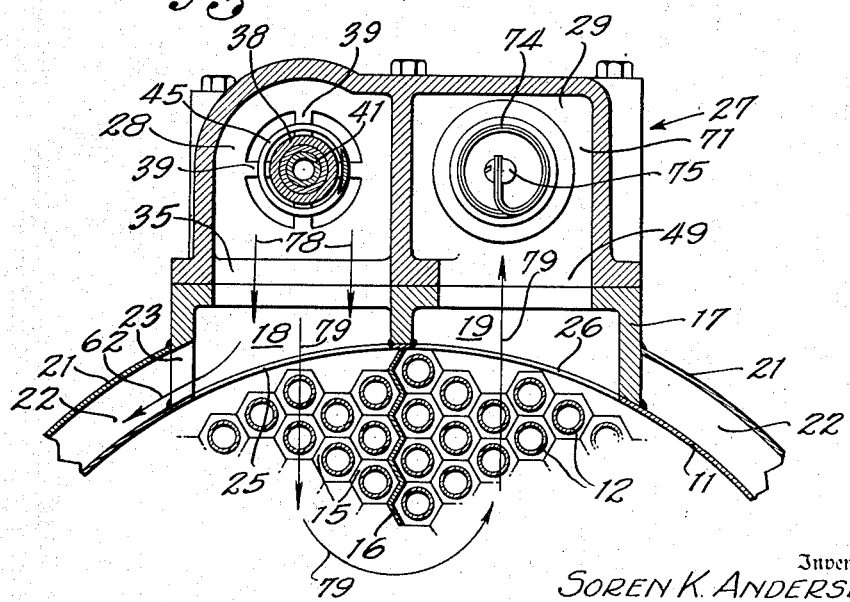
Inventors,
SOREN K. ANDERSEN
CHARLES J. VANOUS
By
Attorney Patented Oct. 23, 1945

2,387,426

UNITED STATES PATENT OFFICE 2,387,426

OIL COOLER PROTECTIVE DEVICE

Soren K. Andersen, Los Angeles, and Charles J. Vanous, Burbank, Calif., assignors to The Garrett Corporation, Airesearch Manufacturing Company division, Los Angeles, Calif., a corporation of California Application October 9, 1941, Serial No. 414,286

22 Claims. (Cl. 257—2)

Our invention relates in general to oil cooling systems for internal combustion engines, and relates in particular to a valve mechanism for protecting the cooler proper, or heat exchanger, from the destructive effects of excessive pressures or pressure surges in the oil circulating system associated therewith.

Oil coolers of the type now generally employed for aircraft installation consist in a cellular type of heat exchanger having inlet and outlet openings which are respectively connected in series with the oil circulating system. It is an object of the invention to provide in conjunction with a heat exchanger in an oil cooling system of the class described means which will automatically close at least the inlet opening of the heat exchanger when a heavy pressure is built up in, or a heavy pressure surge occurs in the oil circulating system.

It is an object of the invention to provide a device which has valve parts associated with the inlet and outlet openings of the cooler, and has cooperating parts which are actuated by oil pressure applied in the oil circulating system, the cooperating valve parts of the device functioning as the result of automatic response to prescribed high pressure conditions to prevent the flow of oil into the interior of the heat exchanger through either the inlet or the outlet openings of the heat exchanger. Accordingly, the invention will not only serve as a protective device for any type of oil cooler, but will enable reduction in the weight of oil coolers now employed in aircraft, this reduction in weight being made possible by the fact that where the invention is employed the bursting strength of the cooler may be reduced, and the protective mechanism may be adjusted so as to prevent from reaching the interior of the cooler any pressure which might be close to the pressure limits established for the cooler.

An object of the invention is to provide a protective device which will be actuated by a pressure in the oil circulating system not greatly in excess of the maximum normal operating pressure, and will protect the heat exchanger from any higher pressure which may be produced in the oil circulating system.

A further object of the invention is to provide a protective unit which may be readily secured to the fitting of the heat exchanger containing the inlet and outlet openings therefor, and which unit has inlet and outlet ports for connection to the hot oil supply piping and the return piping of the oil circulating system.

Although the invention disclosed herein consists in the protective device, it may be readily employed in conjunction with control equipment, such as shown in the patent of George H. Gill, No. 2,348,212 dated May 9, 1944, entitled Electrical flap control, for the operation and control of a flap valve or shutters for controlling the flow of air through the heat exchanger in accordance with the heat content to be removed from the oil to bring the oil to the required temperature for return to the engine.

Further objects and advantages of the invention may be brought out in the following part of the specification.

Referring to the drawings which are for illustrative purposes only:

Fig. 1 is a sectional plan view of a preferred embodiment of our invention in operative position relative to a heat exchanger.

Fig. 2 is a section taken as indicated by the line 2—2 of Fig. 1.

Fig. 3 is a fragmentary cross section taken as indicated by the line 3—3 of Fig. 1.

Fig. 4 is a fragmentary cross-section taken on the plane indicated by the line 4—4 of Fig. 1.

In order to indicate the general type of oil cooler or heat exchanger with which our invention may be employed, we have shown a fragmentary portion of an oil cooler 10, having a thin walled shell 11 of general cylindric form, having tubes 12 assembled therein, these tubes 12 having hexagonal ends 13 adapted to be soldered together in honeycomb form so as to provide end walls 14 to cooperate with the cylindric shell 11 to define an oil cooling space 15 within the shell, such oil cooling space being traversed by the tubes 12 and being broken into oil flow sections by one or more baffles 16. A fitting 17 is secured to the shell 11 for the purpose of providing an oil inlet space 18, a cooler outlet space 19, and a warm up outlet space 20.

The cooler 10 may have an external shell 21 thereon to form a warm up space 22 which extends around and in spaced relation to the shell 11 from one side of the fitting 17 to the other as shown in Figs. 3 and 4. The fitting 17, as shown in Fig. 3, is provided with a port 23 to connect the inlet space 18 with one side of the warm up space 22, and as shown in Fig. 4 is provided with a port 24 to connect the outlet end of the warm up space 22 with the warm up outlet space 20 of the fitting 17. The cooler shell 11 is provided with an inlet port or opening 25 through which hot oil to be cooled may pass from the inlet space 18 into the cooler space 15, in the normal operation of the cooler. Also, the shell 11 has a cooler outlet opening 26, through which the cooled oil may pass into the cooler outlet space 19 of the fitting 17.

One feature of the invention is to provide the protective unit 27 which may be secured to the fitting 17, this unit 27 being chambered so as to provide an inlet passage 28, an outlet passage 29, and the by-pass passage 30. The inlet passage 28 is provided with a threaded port 31 through which the hot oil delivery piping 32 of an oil circulating system may be connected as shown in Fig. 1, and the outlet passage 29 having an outlet port 33 threaded for connection with the return piping 34 of the oil circulating system.

Spaced from the port 31, the inlet passage 28 has a port 35 comprising means for delivery of hot oil from the piping 32 to the inlet opening 25 of the cooler space and the inlet of the warm up space 22 through the inlet 18 of the fitting 17, as shown in Figs. 1 and 4. In the inlet passage 28, between the ports 31 and 35, as shown in Fig. 1, there is a valve seat 36, and substantially aligned with the valve seat 36 the unit 27 provides an aperture 37 of cylindric form, this aperture having the outer end thereof communicating with the exterior of the unit 27. A guide sleeve 38, as shown in Fig. 1, is supported at the inner end of the aperture 37 by radial arms 39.

To provide a wall movable by pressure exerted in the inlet passage 28, we have shown a piston 40. This piston 40 has an axial stem 41, which projects into the inlet passage 28 and through the opening provided by the valve seat 36 to support between the valve seat 36 and the port 31 a valve closure 42 of the general form referred to as a poppet valve. This closure 42 is separable from the stem 41 and is secured on the reduced end 43 thereof after the piston 40 and its projecting stem 41 are placed in operative position, by means of a nut 44. A compression spring 45 is placed between the closure 42 and the radial arms 39, to exert a yieldable force tending to hold the closure 42 in spaced relation to the valve seat 36. Leakage of oil through the aperture 37 is prevented by packing means shown in the form of a cup-shaped sealing member 46 held in operative position around the piston 40 by a cover 47 having openings 48 therein through which external atmospheric pressure may be communicated to the rear or outer end of the piston 40.

The outlet passage 29, as shown in Figs. 1, 2 and 3, has at the end thereof opposite from the outlet port 33, a port 49 which communicates with the cooler outlet space 19 which in turn communicates directly with the cooler outlet opening 26. As shown in Figs. 1 and 2, there is an apertured wall 50 in the outlet passage 29, near the outlet port 33, this wall 50 carrying a valve seat 51 for cooperative relation to a check valve 52 which is urged downwardly to engagement with the valve seat 51 by a compression spring 53. This check valve 52 has a stem 54 projecting upwardly into a guide 55 forming a downwardly projecting part of a threaded cover 56, Fig. 2. This cover 56 closes an opening 57 in the upper wall of the unit 27, of such diameter that when the cover 56 is removed from the position in which it is shown, the check valve 52 and also the seat 51 may be passed through the opening 57.

Between the port 33 and the wall 50, the protective unit 27 has a warm up outlet port to connect the warm up outlet space 20 with the outlet passage 29. Associated with this warm up outlet port 58 there is a control valve 59 for controlling the flow of warm up oil through the warm up space 22. This control valve 59 is shown with an extensible bellows thermostat 60 supported by a plug or body 61 removably threaded in the upper wall of the protective unit 27. During the normal operation of the cooler, the thermostat element 60 is warmed by the oil which passes through the outlet passage 29 so that the control valve 59 is moved into a position to substantially close the port 58, as shown in Fig. 2. When the oil in the outlet passage 29 cools down, as for example during inoperative periods or due to interruptions of the flow of oil from the port 49 through the outlet passage 29 to the port 33, the thermostat element 60 will contract so as to lift the control valve 59 as shown in Fig. 4, thereby permitting warm up oil to flow through the warm up space 22 of the cooler as indicated by arrows 62 and 63 of Figs. 3 and 4.

The by-pass passage 30 has valve means 64 therein, such valve means comprising a valve seat 65 to form a valve port 66 between the rightward end of the inlet passage 28 and the by-pass passage 30; a closure 67 supported within the by-pass passage 30 by a guide 68 for cooperation with the rightward portion of the valve seat 65. The guide 68 projects inwardly from a plate 69 which is removably secured to the body of the protective unit, as shown in Fig. 1. A compression spring 70 operates between the valve 67 and the plate 69 to yieldably urge the valve 67 into engagement with the valve seat 65.

It will be understood that our protective unit may be used in conjunction with auxiliary or supplementary control means such as may be required for the control of a flap or shutters, not shown, to vary the flow of air through the tubes 12 of the cooler. The leftward end wall 71 of the outlet passage 29 is shown with an aperture 72 in which such supplementary control unit 73 may be mounted. This control unit 73 is shown with an inwardly projecting thermostat 74 of spiral bi-metallic type, exposed to the oil which passes through the outlet passage 29, and having therein a shaft 75 to which rotary movement is applied by the thermostat 74 as the temperature of the thermostat varies. The control unit 73 has an external casing 76 in which switches, etc., are placed, as disclosed in the previously identified Gill patent, for cooperation with the thermostat 74, the details thereof not being shown in this application for the reason that the control unit 73 and the operative mechanism thereof form no part of the present invention.

The spring 53 associated with the check valve 52 is of such size as to yield in response to relatively low pressure against the lower face of the valve 52. Accordingly, when oil is fed to the protective unit 27 under normal conditions of operation, such oil will flow through the inlet passage 28 as indicated by arrows 77 in Fig. 1. The oil will flow from the leftward end of the inlet passage down through the port 35 as indicated by arrows 78 in Fig. 3, and will then flow through the cooler space 15 and the cooler outlet space 19 to the inlet port 49 of the outlet passage 29 as indicated by arrows 79. As shown in Fig. 2, the cooled oil from the cooler space 15 will pass upwardly from the port 49 as indicated by arrows 80, and as indicated by arrows 81, the oil will pass upwardly from the rightward end of the outlet passage 29 through the opening 82 of the check valve seat 51, lifting the check valve 52 in so doing. From the extremity of the outlet passage 29 the oil will flow into the return piping 34 as indicated by arrows 83 in Fig. 1. The spring 45 associated with the valve 42, Fig. 1, is of such strength that it will resist outward movement of the piston 40 against the fluid pressure in the inlet passage 28 somewhat greater than the normal operating pressure of the oil circulating system, but considerably less than the maximum safe working pressure of the cooler 10. Should heavy pressure be built up in the inlet passage 28 such pressure will be transmitted to the inner end of the piston 40, causing the piston 40 to move outward or leftward against the force of the spring 45. The closure 42 will be thereby moved toward the valve seat 36, and as the closure 42 approaches the valve seat, the friction of oil passing through the reduced space between the periphery of the valve 42 and the seat 36, together with the pressure exerted against the rightward face of the valve 42, will move the valve 42 into tight engagement with the valve seat 36, thereby cutting off communication between the inlet or hot oil piping 32 and the outlet port 35 of the inlet passage 28 which communicates with the inlet port 23 of the warm up space 22 and the inlet opening 25 of the cooler space 15. This closing of the valve 42 occurs when a prescribed increase in pressure is produced in the inlet passage 28. The pressure of fluid thereafter delivered through the hot oil piping 32 may thereafter increase dangerously above the pressure required to operate the valve 42, but such dangerous pressure cannot be transmitted through the opening of the valve seat 36.

The spring 70 of the pressure release valve 67 associated with the by-pass passage 30 is gaged so that the valve 67 will yield from its position closing the opening 66 of the valve seat 65 at a pressure slightly greater than the pressure required for the closing of the valve 42. Accordingly, closing of the valve 42 does not act to stop the flow of oil through the oil circulating system, but the oil may pass directly from the delivery piping 32 through the by-pass passage 30 and that portion 84 of the outlet passage 29 above the wall 50, to the return piping 34 which will carry the oil back to the engine or to the reservoir provided therefor.

The spring 53 associated with the check valve 52 will normally move the valve 52 into engagement with the seat 51 against a small pressure applied to the lower face thereof, accordingly, this check valve 52 will close before the pressures above and below the same are equalized, this giving assurance that when a high pressure surge is transmitted through the by-pass passage 30 to the space 83 above the valve 52, this valve 52 will be closed and will prevent a downward flow of pressure through the opening 82 of the valve seat 51, and will thereby guard the oil cooler 10 against a build up of pressure as the result of fluid pressure applied to its outlet openings.

We claim as our invention:

1. In an oil cooling system of the class described, a protective device for connecting an oil cooler having an inlet opening and outlet opening to the hot oil delivery piping and the cooled oil return piping of the oil cooling system, including: wall means forming an inlet passage to connect said delivery piping to said inlet opening of cooler; wall means forming an outlet passage for connecting said outlet of the cooler with said return piping; wall means forming a by-pass passage connecting said inlet passage with said outlet passage; a valve for said by-pass passage opening in response to pressure in said inlet passage to permit a flow of oil through said by-pass passage to said outlet passage; valve means associated with said inlet passage operating in response to pressure in said inlet passage to prevent flow of oil from said delivery piping through said inlet passage to the interior of said cooler; and valve means associated with said outlet passage to prevent a flow of oil from said return piping to the outlet of said cooler.

2. In an oil cooling system of the class described, a protective device for connecting an oil cooler having an inlet opening and outlet opening to the hot oil delivery piping and the cooled oil return piping of the oil cooling system, including: wall means forming an inlet passage to connect said delivery piping to said inlet opening of cooler; wall means forming an outlet passage for connecting said outlet of the cooler with said return piping; wall means forming a by-pass passage connecting said inlet passage with said outlet passage; a valve for said by-pass passage opening in response to pressure in said inlet passage to permit a flow of oil through said by-pass passage to said outlet passage; and valve means associated with said inlet passage operating in response to pressure in said inlet passage to prevent flow of oil from said delivery piping through said inlet passage to the interior of said cooler.

3. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; and valve means associated with said inlet passage means, operating in response to excess pressure in said inlet passage means to prevent a flow of oil from said delivery piping to said inlet openings of said heat exchanger and said warm-up space.

4. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; and valve means associated with said inlet passage means, operating in response to excess pressure in said inlet passage means to prevent a flow of oil from said delivery piping to said inlet openings of said heat exchanger and said warm-up space; and valve means associated with said outlet passage means to prevent a flow of oil from said return piping to said outlet openings of said heat exchanger and said warm-up space.

5. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; and valve means associated with said inlet passage means, operating in response to excess pressure in said inlet passage means to prevent a flow of oil from said delivery piping to said inlet of said heat exchanger; and check valve means associated with said outlet passage means to prevent a flow of oil from said return piping to said outlet openings of said heat exchanger.

6. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; and protective valve means associated with said inlet passage means, operating in response to excess pressure in said inlet passage means to prevent a flow of oil from said delivery piping to said inlet of said heat exchanger, said protective valve means comprising a valve closure and a valve seat, a movable wall having an inner face exposed to the pressure of said oil and another face exposed to external pressure, means to control the outward movement of said movable wall by said pressure of said oil and means to move said valve closure into engagement with said valve seat in response to said outward movement of said wall.

7. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; check valve means associated with said outlet passage means to prevent a flow of oil from said return piping to said outlet openings of said heat exchanger; and protective valve means associated with said inlet passage means, operating in response to excess pressure in said inlet passage means to prevent a flow of oil from said delivery piping to said inlet of said heat exchanger, said protective valve means comprising a valve closure and a valve seat, a movable wall having an inner face exposed to the pressure of said oil and another face exposed to external pressure, means to control the outward movement of said movable wall by said pressure of said oil and means to move said valve closure into engagement with said valve seat in response to said outward movement of said wall.

8. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; and valve means associated with said inlet passage means, operating in response to excess pressure in said inlet passage means to prevent a flow of oil from said delivery piping to said inlet of said heat exchanger; and a warm up flow control valve operating between said warm up outlet opening and said outlet passage means to control the flow of oil through said warm up space of said cooler to said outlet passage means.

9. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening, said inlet passage means comprising a wall forming an aperture communicating with the exterior; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; and protective valve means associated with said inlet passage means, operating in response to excess pressure in said inlet passage means to prevent a flow of oil from said delivery piping to said inlet of said heat exchanger, said protective valve means comprising a closure and a valve seat, a piston in said aperture of said inlet passage means, spring means to resist outward movement of said piston in said aperture, and means to move said closure into engagement with said valve seat in response to outward movement of said piston in said aperture.

10. In a protective device for connecting to the hot oil delivery piping and the cooled oil return piping of an oil cooling system, a heat exchanger having a cooler space with a cooler inlet opening and a cooler outlet opening, and a warm up space having a warm up inlet opening and a warm up outlet opening, the combination of: inlet passage means for connecting said delivery piping to said cooler inlet opening and said warm up inlet opening, said inlet passage means comprising a wall having a port at one end to connect with said delivery piping and having at the other end thereof a cylindrical opening communicating with the exterior and a port to connect with said inlet openings, and a valve seat positioned between said ports; outlet passage means for connecting said return piping to said cooler outlet opening and said warm up outlet opening; by-pass passage means connecting said inlet passage means with said outlet passage means; by-pass valve means for said by-pass passage means operating in response to pressure in said inlet passage means to permit a flow through said by-pass passage means to said outlet passage means; and protective valve means associated with said inlet passage means, operating in response to excess pressure in said inlet passage means to prevent a flow of oil from said delivery piping to said inlet of said heat exchanger, said protective valve means comprising a valve closure positioned between said valve seat and said first named port, a piston in said cylindrical opening movable outward by pressure in said inlet passage means, a valve stem connecting said piston and said closure whereby outward movement of said piston will move said closure into engagement with said valve seat, and a spring to urge said closure away from said valve seat to normally hold the same in opened position.

11. In an oil cooling system of the class described, a protective device for connecting an oil cooler and a warm-up space each having an inlet opening and outlet opening to the hot oil delivery piping and the cooled oil return piping of the oil cooling system, including: wall means forming an inlet passage to connect said delivery piping to said inlet opening of cooler and the inlet opening of said warm-up space; wall means forming an outlet passage for connecting said outlet of the cooler with said return piping; wall means forming a by-pass opening connecting said inlet passage with said outlet passage; means for controlling the flow of oil through said by-pass opening; and valve means associated with said inlet passage operating in response to pressure in said inlet passage to prevent flow of oil from said delivery piping through said inlet passage to the interior of said cooler and said warm-up space.

12. In an oil cooling system of the class described, a protective device for connecting an oil cooler having an inlet opening and outlet opening to the hot oil delivery piping and the cooled oil return piping of the oil cooling system, including: wall means forming an inlet passage to connect said delivery piping to said inlet opening of cooler; wall means forming an outlet passage for connecting said outlet of the cooler with said return piping; wall means forming a bypass opening connecting said inlet passage with said outlet passage; means for controlling the flow of oil through said bypass opening; valve means associated with said inlet passage operating in response to pressure in said inlet passage to prevent flow of oil from said delivery piping through said inlet passage to the interior of said cooler; and valve means associated with said outlet passage to prevent a flow of oil from said return piping to the outlet of said cooler.

13. In a liquid cooler system, the combination of: a cooler; inlet means for conducting the liquid to be cooled into the interior of the cooler; outlet means for carrying the cooled liquid away from the cooler; a valved bypass connecting said inlet means and said outlet means; a protective valve associated with said inlet means operating in response to a pressure condition in the liquid creating an excess pressure in said inlet means to prevent a flow of liquid from said inlet means into the interior of said cooler; and a protective valve for preventing a flow of liquid from said outlet means into the interior of said cooler.

14. In a liquid cooler system, the combination of: a cooler; inlet means for conducting the liquid to be cooled into the interior of the cooler; outlet means for carrying the cooled liquid away from the cooler; means forming a bypass connecting said inlet means and said outlet means; pressure relief valve means for controlling the flow of liquid through said bypass; and a protective valve associated with said inlet means operating in response to a pressure condition in the liquid creating an excess pressure in said inlet means to prevent a flow of liquid from said inlet means into the interior of said cooler.

15. In a liquid cooler system, the combination of: a cooler; inlet means for conducting the liquid to be cooled into the interior of the cooler; outlet means for carrying the cooled liquid away from the cooler; means forming a bypass connecting said inlet means and said outlet means; bypass valve means for controlling the flow of liquid through said bypass; and a protective valve associated with said inlet means operating in response to a pressure condition in the liquid creating an excess pressure in said inlet means to prevent a flow of liquid from said inlet means into the interior of said cooler, said protective valve comprising a wall having a valve port therein, a valve closure, a movable wall having its inner face exposed to the pressure of said liquid and an outer face exposed to external pressure, means for controlling the rate of outward movement of said movable wall by the pressure of said liquid, and means to move said valve closure into closed position relative to said port in response to said outward movement of said movable wall.

16. In a liquid cooler system, the combination of: a cooler; inlet means for conducting the liquid to be cooled into the interior of the cooler; outlet means for carrying the cooled liquid away from the cooler; means forming a bypass for diverting liquid from said inlet means around said cooler to said outlet means, the rear end of said bypass being connected to said outlet means; pressure limiting means for controlling the flow of liquid through said bypass; a protective valve associated with said inlet means operating in response to a pressure condition in the liquid creating an excess pressure in said inlet means to prevent a flow of liquid from said inlet means into the interior of said cooler; and a protective valve preventing a flow of liquid from said outlet means into the interior of said cooler, said last named protective valve being positioned between said rear end of said bypass and the cooler.

17. In an oil cooling system for internal combustion engines including means for circulating therethrough oil to be cooled, which system, under some conditions of operation is subject to surges of excess pressure therein, the combination of: a cooler; means forming a warm up space for said cooler; means including an inlet into said cooler and warm up space respectively for delivering heated oil into the interior of the cooler and into said warm up space respectively; outlet means for carrying the cooled oil away from the cooler; and a normally open protective valve associated with said inlet means, having a closure disposed in upstream relation to a valve port and operative in response to said pressure surges to move said closure downstream into flow opposing cooperation with said port to prevent the imposition of the excess pressure of said surges upon either the interior of said cooler or said warm up space.

18. In an oil cooling system for internal combustion engines including means for circulating oil therethrough and which system under some conditions of operation is subject to surges of excess pressure therein, the combination of: a cooler; means forming a warm up space for said cooler means including an inlet into said cooler and warm up space respectively for delivering heated oil into the interior of the cooler and into said warm up space respectively; outlet means for carrying the cooled oil away from the cooler; a normally open protective valve associated with said inlet means, having a closure disposed in upstream relation to a valve port and operative in response to said pressure surges to move said closure downstream into flow opposing cooperation with said port to prevent the imposition of the excess pressure of said surges upon either the interior of said cooler or said warm up space; and pressure relief means associated with said delivering means and operative to relieve the inlet side of said delivering means of pressures in excess of the pressure at which said protective valve moves into flow opposing cooperation with said port.

19. In an oil cooling system for an internal combustion engine including an oil cooler and means for circulating oil therethrough which system, under some conditions of operation, is subject to surges of excess pressure therein, the combination of: means for delivering the oil to be cooled into the cooler; a protective valve associated with said delivering means, operative in response to excess pressure in said delivering means to prevent the imposition of said excess pressures upon the interior of the cooler; and pressure relief means associated with said delivering means, operative to relieve the inlet side of said delivering means of pressures in excess of the pressure at which said protective valve becomes effective to prevent the imposition of said excess pressures on the interior of the cooler.

20. In an oil cooling system for an internal combustion engine including an oil cooler and means for circulating the oil therethrough and which system, under some conditions of operation, is subject to the development of surges of excess pressure therein, the combination of: inlet means for conducting the oil to be cooled into the cooler; a protective valve associated with said inlet means and adapted, in response to pressure surges therein, to prevent the imposition of said pressure surges upon the interior of said cooler; bypass means for conducting the oil away from said inlet means, bypassing the interior of the cooler; and a pressure relief valve associated with said bypass means, operative to relieve said inlet means on the inlet side of said protective valve, through said bypass, of pressures in excess of the pressure at which said protective valve becomes effective to prevent the imposition of pressure surges upon the interior of the cooler.

21. In a liquid cooling system, the combination of: a cooler; inlet means for conducting the liquid to be cooled into the cooler; a protective valve associated with said inlet means, operative in response to pressure conditions in the liquid creating an excess pressure in said inlet means to prevent flow of liquid from said inlet means to said cooler; and pressure relief means associated with said inlet means, operative to relieve said inlet means on the inlet side of said protective valve of said excess pressures.

22. In a liquid cooling system, the combination of: a cooler; inlet means for conducting the liquid to be cooled into the cooler; outlet means for conducting the cooled liquid away from the cooler; a protective valve associated with said inlet means, operative in response to a pressure condition in the liquid creating an excess pressure in said inlet means, to prevent flow of said liquid from said inlet means into said cooler; bypass means communicating with said inlet means on the inlet side of said protective valve, for conducting liquid away from said inlet means, bypassing the cooler; and a pressure relief valve associated with said bypass means, operative to permit flow through said bypass to relieve said inlet means of pressures in excess of the pressure at which said protective valve becomes effective to prevent flow into the cooler.

SOREN K. ANDERSEN.
CHARLES J. VANOUS.